US012697712B2

(12) United States Patent
Beard, III et al.

(10) Patent No.: US 12,697,712 B2
(45) Date of Patent: Aug. 4, 2026

(54) METHOD FOR PRECISE, INTUITIVE POSITIONING OF ROBOTIC WELDING MACHINE

(71) Applicant: Robotic Technologies of Tennessee, LLC, Cookeville, TN (US)

(72) Inventors: James Walter Beard, III, Cookeville, TN (US); Stephen Lee Canfield, Cookeville, TN (US); Stephen Giovanni Zuccaro, Cookeville, TN (US); Nicholas Canfield, Cookeville, TN (US)

(73) Assignee: Robotic Technologies of Tennessee, LLC, Cookeville, TN (US)

( * ) Notice: Subject to any disclaimer, the term of this patent is extended or adjusted under 35 U.S.C. 154(b) by 144 days.

(21) Appl. No.: 18/822,178

(22) Filed: Aug. 31, 2024

(65) Prior Publication Data

US 2024/0416504 A1 Dec. 19, 2024

Related U.S. Application Data

(63) Continuation of application No. 17/587,946, filed on Jan. 28, 2022, now Pat. No. 12,076,857.

(51) Int. Cl.
| | |
|---|---|
| *B25J 9/16* | (2006.01) |
| *B25J 9/00* | (2006.01) |
| *B25J 13/08* | (2006.01) |

(52) U.S. Cl.
CPC ............. *B25J 9/0081* (2013.01); *B25J 13/08* (2013.01)

(58) Field of Classification Search
CPC .......... B25J 9/041; B25J 13/085; B25J 13/08; A61B 34/77; A61B 2017/00314
See application file for complete search history.

(56) References Cited

U.S. PATENT DOCUMENTS

| | | | |
|---|---|---|---|
| 4,283,764 A | 8/1981 | Crum et al. | |
| 4,367,532 A | 1/1983 | Crum et al. | |

(Continued)

FOREIGN PATENT DOCUMENTS

| | | |
|---|---|---|
| DE | 102009041946 A1 | 3/2011 |
| DE | 102015117306 B4 | 1/2018 |

(Continued)

OTHER PUBLICATIONS

International Search Report and Written Opinion PCT/US2022/049422, mailed Feb. 8, 2023.

*Primary Examiner* — Dalena Tran
(74) *Attorney, Agent, or Firm* — Master Key IP, LLP; Jeromye V. Sartain

(57) ABSTRACT

This patent defines a method for making robot programming more intuitive for tasks such as welding. The method further is an enhancement of manual guiding methods of robot positioning and can improve situations in which finer resolution or control of the robot end-effector is required. A motion sensor is mounted in series with the n–1 joint and in parallel with the $n^{th}$ joint, where n is the number of degrees of freedom or number of joints of the serial manipulator. The motion sensor is further mounted directly in-line with the $n^{th}$ joint and becomes part the opposing portion of the $n^{th}$ joint. The motion sensor further is uniquely adapted to apply to non-spherical wrist robots. The motion sensor senses input movements by a robot operator and controls the output tool motion in a controlled manner with resolution defined by user input at the motion sensor.

21 Claims, 11 Drawing Sheets

(56) References Cited

U.S. PATENT DOCUMENTS

| | | | |
|---|---|---|---|
| 4,408,286 A | | 10/1983 | Kikuchi et al. |
| 4,589,810 A | | 5/1986 | Heindl et al. |
| 5,046,022 A | * | 9/1991 | Conway ................. B25J 9/1689 |
| | | | 700/250 |
| 5,495,410 A | | 2/1996 | Graf |
| 6,385,508 B1 | | 5/2002 | McGee et al. |
| 8,175,749 B2 | | 5/2012 | Tsusaka et al. |
| 9,524,268 B2 | * | 12/2016 | Crane, III ............... G06F 17/00 |
| 9,582,077 B2 | | 2/2017 | Rosenberg |
| 10,191,548 B2 | | 1/2019 | Kukimoto et al. |
| 10,260,970 B2 | | 4/2019 | Lauzier et al. |
| 10,807,247 B2 | | 10/2020 | Murakami |
| 11,034,022 B2 | | 6/2021 | Yamamoto et al. |
| 11,117,254 B2 | | 9/2021 | Battisti |
| 11,154,985 B1 | | 10/2021 | Strauss |
| 11,154,987 B2 | | 10/2021 | Miyazawa et al. |
| 11,192,247 B2 | | 12/2021 | Matsushima |
| 11,794,339 B2 | * | 10/2023 | Masuda ..................... B25J 9/16 |
| 2009/0125146 A1 | | 5/2009 | Zhang et al. |
| 2009/0326679 A1 | | 12/2009 | Iba |
| 2014/0135991 A1 | | 5/2014 | Summer et al. |
| 2014/0195010 A1 | | 7/2014 | Beira |
| 2014/0276953 A1 | * | 9/2014 | Swarup .................. A61B 50/13 |
| | | | 606/130 |
| 2015/0366546 A1 | | 12/2015 | Kamen |

| | | | |
|---|---|---|---|
| 2017/0028549 A1 | | 2/2017 | Battisti |
| 2017/0225804 A1 | | 8/2017 | Hafenrichter |
| 2018/0290301 A1 | * | 10/2018 | Haddadin ................ B25J 9/163 |
| 2018/0297204 A1 | | 10/2018 | Krasny |
| 2019/0143522 A1 | | 5/2019 | Miyazawa et al. |
| 2019/0160685 A1 | | 5/2019 | Murakami |
| 2019/0350662 A1 | | 11/2019 | Huang |
| 2020/0164503 A1 | | 5/2020 | Battisti |
| 2021/0001484 A1 | | 1/2021 | Bogart et al. |
| 2021/0260750 A1 | | 8/2021 | Beard, III et al. |
| 2022/0378524 A1 | * | 12/2022 | Schreiber .............. A61B 90/37 |

FOREIGN PATENT DOCUMENTS

| | | | |
|---|---|---|---|
| DE | 102015012959 B4 | 1/2019 | |
| DE | 102017003000 B4 | 7/2019 | |
| DE | 102019008337 A1 | 6/2020 | |
| DE | 102020206568 B4 | 1/2022 | |
| EP | 2299344 B1 | 10/2013 | |
| JP | 5467508 B2 | 4/2014 | |
| JP | 2017064878 A | 4/2017 | |
| JP | 6489991 B2 | 3/2019 | |
| JP | 6730247 B2 | 7/2020 | |
| KR | 101631033 B1 | 6/2016 | |
| KR | 101819789 B1 | 1/2018 | |
| WO | 2010088959 A1 | 8/2010 | |
| WO | 2017152208 A1 | 9/2017 | |

* cited by examiner

METHOD FOR PRECISE, INTUITIVE POSITIONING OF ROBOTIC WELDING MACHINE

RELATED APPLICATION

This is a continuation-in-part patent application and so claims the benefit pursuant to 35 U.S.C. § 120 of a prior filed and co-pending U.S. Non-Provisional patent application Ser. No. 17/587,946 filed Jan. 28, 2022, and entitled "Method for Precise, Intuitive Positioning of Robotic Welding Machine," which itself claims priority pursuant to 35 U.S.C. § 119(e) to and is entitled to the filing date of U.S. Provisional Patent Application Ser. No. 63/277,956 filed Nov. 10, 2021, and entitled "Method for precise, intuitive positioning of robotic welding machine." The contents of the aforementioned applications are incorporated herein by reference.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates to a robot system and a method for controlling the robot system. Robots are commonly used for automated MIG (Metal Inert Gas) welding in many industries such as automotive manufacturing. A weld procedure is defined and the robot performs motion control of the weld torch along the weld seam, while starting and stopping the arc as desired along the weld seams. In many cases, weld parameters are coordinated between the robot and the welding power supply to provide advanced weld characteristics and capabilities. The most common method of teaching a robotic weld path is by using the lead-through-teach program approach. In this approach, the robot is manually driven to key locations along the weld path and those positions are stored. The robot will travel linear or curvilinear segments between these positions. For correct welding, the torch must be accurately positioned by the robot. When using a teaching apparatus, traditionally called a teach pendant, accurate positioning is assisted by slow speed jog moves directed from the teach pendant. However, in many cases using the teach pendant to control the robot is non-intuitive or difficult without significant training and practice. A more recent approach allows the user to directly guide the robot end-effector manually (see, for example, German Patent No. DE102015012959B4). This may be called direct human-robot collaboration. However, it can be difficult to achieve the precise positioning required through manual guiding of the robot. Some of the possible reasons for this include friction in the system, gravitation deflection, or cogging characteristics associated with brushless motors with strain-wave gear trains.

In the direct human-robot collaboration method, if more precise positioning is required, it may be necessary for the operator to leave the robot and to use the teach pendant for robot control. International PCT Patent Application Publication No. WO2010088959A1 shows a method configured to switch between a floating control mode which allows direct human-robot collaboration and a position control mode which allows robot control through sensor input. This slows down the training process and makes the procedure less intuitive.

An improved approach would be one that allows the operator to maintain direct human-robot collaboration by maintaining contact with the robot during the entire lead-through teach process but allowing the operator to switch between "drag-teach" mode and "guide teach" mode. Here, drag-teach mode refers to the method in which the robot is physically moved by the operator while the guide-teach mode refers to a method in which the robot is controlled by movements of a sensor which is located directly on the robot.

This invention seeks to reduce the complexity of programming associated with robots for tasks such as welding.

DESCRIPTION OF THE PRIOR ART

Programming the operating path adds time to the overall manufacturing process. When the operating path is used in manufacturing large numbers of similar parts, i.e., parts that can be welded using a common operating path, the time required to program the operating path represents a small portion of the overall manufacturing cost. When manufacturing a small number of repetitive parts, the time to program the operating path can be significant. It is therefore desirable to reduce the programming time. Methods used to reduce the programming time include programming successive robot positions by lead-through-teaching on an actual part (U.S. Pat. No. 4,408,286), offline programming on a computer simulation of the manufacturing setup, or automated robot motion programming (U.S. Patent Application Publication No. US2009/0125146). The teach pendant programming method is generally disclosed in U.S. Pat. No. 4,589,810. This is referred to as on-line programming method in which the programmer makes use of an interface that may include switches or a joystick to move the end-effector though an operating path with respect to the actual part being manufactured. The program is constructed by recording successive positions into memory in a computer that is associated with the robot system. The recorded information consists of information that generally includes the robot position and orientation, robot speed, linear or curvilinear motion type, and arc information. This information serves as a series of instructions recorded in a sequential fashion and forms a program or code that is stored into memory in a computer that is associated with the robot system. The welding robot performs a pre-programmed welding task by operating according to the instructions that are stored in the program.

This patent makes use of the lead-through-teaching method as is generally disclosed in U.S. Pat. No. 4,408,286. The lead-through-teaching method involves teaching successive positions of the operating path by grasping or guiding the tool head directly to follow a path. The robot is moved to a specific position and orientation at specific points along the path and these specific positions and orientations are recorded in a program that resides in memory in a computer associated with the robot system. The program defines the operating path that passes through the specific points and travels along an interpolated path between the specific points. The interpolated path could be linear, quadratic, or some other interpolating function as defined by the programmer. The programmer is responsible to ensure that the robot is accurately guided to the specific points and avoids collision with objects in the workspace. The programmer also defines any additional functions that the robot will perform. These include turning the arc on or off, other arc information, the type of move (linear or curvilinear), and the speed of the tool. In the most common case, these values are numerically entered using a teach pendant. They can be also entered with buttons located on a handle associated with the robot end-effector. Examples of lead-through handles that are commonly found in commercial products for robotics welding applications include grasping the robot weld torch (Yasakawa Robotiq Kinteq) or grabbing a combination of the robot weld torch and robot end-effector (Arc Specialties SNAPWELD). Other examples of lead-through handles have been disclosed in patents including U.S. Pat. Nos. 5,495,410, 4,408,286, 4,367,532, and 6,385,508.

The following art considers robot manipulation control through some type of sensor placed on the robot. Japanese Patent Nos. JP6489991B2 and JP5467508B2 disclose a sensor with two perpendicular handles attached to the tip of the arm for moving the robot based on motion at the handles. Japanese Patent No. JP6730247B2 discloses a sensor attached to the distal end of the arm to sense motion or force and control the robot. In particular, the sensor can be detached or attached to the robot at different locations. Japanese Patent No. JP2017064878A shows a sensor attached to the arm tip, allowing the robot to be controlled through handles attached to the sensor. U.S. Pat. No. 8,175,749 shows a control apparatus to allow corrections to the robot by direct manual guiding of the robot. Korean Patent No. KR101631033B1 shows a robot arm allowing the operator to move the arm by hand according to applied forces on the arm or end-effector and a control device that makes the manipulator arm respond with an assigned stiffness value.

U.S. Pat. No. 11,117,254 shows a robotic navigation system that includes a handheld navigation unit with motion sensor that can also be mounted on the robot. German Patent No. DE102017003000B4 describes a force/motion detection handle allowing an operator to control the robot according to forces measured at the handle and external forces. U.S. Pat. No. 10,260,970 shows a force/torque sensor to measure navigation signals at the end-effector to control the end-effector. U.S. Pat. No. 4,283,764 shows an early example of a manual-guided robot using a force transducer in series with the robot links.

The proposed invention considers most specifically a six degree-of-freedom motion sensor placed on the robot arm at a location other than the end-effector, between joint five and joint six for a six-degree-of-freedom robot, and in-line or colinear with the last joint of the robot manipulator. Japanese Patent No. JP6730247B2 discloses a sensor attached to the distal end of the arm to sense motion or force and control the robot. The patent also shows how the motion sensor can be detached or attached to the robot at different locations along the robot arm. The patent does not consider a six-degree-of-freedom motion sensor, and further does not provide a means to place the sensor in-line with the last joint of the robot. U.S. Pat. No. 11,117,254 shows a robotic navigation system that includes a motion sensing unit (called a handheld navigation unit) with motion sensor that can also be mounted on the robot. This patent does show a six-degree-of-freedom motion sensor. This patent does not show how the motion sensor can be placed in-line with the last joint of the robot and further does not show how the motion sensor can be placed in-line with the last joint but on the robot arm at a location other than the end-effector. The proposed invention considers most specifically a six-degree-of-freedom motion sensor placed on the robot arm at a location other than the end-effector, and in-line with the last joint of the robot manipulator. The value of these components of the invention are described as follows. A six-degree-of-freedom motion sensor is desirable to control all six degrees of freedom of end-effector motion of a six-degree-of-freedom robot. Placing the motion sensor on the robot arm at a location other than the end-effector makes it much more convenient for the operator to use since it does not undergo large rotations commonly associated with the last joint of a robot manipulator. Placing the motion sensor in-line with the last joint of the robot manipulator makes the sensor highly intuitive to use because it shares a majority of the motion of the end-effector, it can align with a tool attached to the end-effector, and in many cases the tool center point (TCP) lies along the axis defined by the last joint. The motion sensor is mounted in a semi-permanent fashion which makes the motion sensor compact and greatly reduces potential collisions with other parts of the robot during operation. Finally, the proposed invention shows a means to scale the ratio of input motion from the motion sensor to the output motion of the robot manipulator, allowing a mix of both high-precision motion control as well as high-speed motion control of the robot manipulator.

In a further aspect, the invention also optionally considers haptic feedback or a physical stimulus to simulate a tactile experience. The prior art demonstrates a variety of ways that tactile feedback can be implemented. A commercial example is the Phantom Omni, a haptic device that can move in six degrees of freedom ("dof") while providing force feedback to the user with three dof. A user interacts with the Phantom Omni by grasping a pen, and the serial architecture of the Phantom Omni can provide predefined forces to the pen. This type of device can be used with applications to provide force feedback from a digital model. The Phantom Omni represents a haptic system that can be integrated with other applications. Another classic example is a game controller having a haptic effect (see, for example, Korean Patent No. KR101819789B1). U.S. Pat. No. 10,191,548 as another example shows a multidirectional control system with shear feedback using shape memory alloy actuators to target areas of a user's skin. U.S. Pat. No. 9,582,077 shows a force feedback system connected to an interface device such as a joystick use in conjunction with a graphical user interface displayed by a host computer system. Haptic devices are sometimes used on robot systems, often in a master-slave device. U.S. Patent Application Publication No. US2014/135991 shows a hybrid hand controller as a full haptic controller to control a slave device (or a robot device). And U.S. Patent Application Publication No. US2020/0164503 refers to a user interface that may be associated with a number of I/O devices including haptic devices. These examples of prior art demonstrate haptic applications that are placed in controllers or devices that are separate from the operable system and integrate through a digital model or representation of the world, or when used with robot systems represent haptic control through an external control system rather than a haptic device that is embedded within the robot system.

SUMMARY OF THE INVENTION

This patent defines a method for making robot programming more intuitive for tasks such as welding, and further simplified programming of robot motion that does not require the operator to have knowledge or understanding or skill in using traditional robot teach pendants. The method further is an enhancement of manual guiding methods of robot positioning and can improve situations in which finer resolution or control of the robot end-effector is required, in particular, when manual guided motion may be limited by factors that make it difficult to precisely move the robot or amplify the resolution provided by hand. In these situations, the invention provides a motion sensor to amplify the resolution of the user and provide these in a frame that is intuitive and convenient for training the robot to a specific task. In this particular example, the task under consideration is welding. The invention provides motion sensing provided in a particular frame that is attached and located at the tool tip or torch tip during welding tasks. The frame is generally oriented with respect to the workpiece so that the operator can get intuitive motion of the robot while viewing the workpiece. For example, if the workpiece is configured on a table, with x, y axes defining the plane of the table and the z axis defining the plane orthogonal to the table, the table x, y, z axes provide the frame of reference for the motion sensor. This allows the user to move the robot end-effector easily in the x, y, z directions of the workpiece.

The motion sensor is mounted in series with the n−1 joint and is mounted in parallel with joint n, where n is the number of degrees of freedom or number of joints of the serial manipulator and for this work is assumed to take on a value of 6. The motion sensor is further mounted directly in-line with the $n^{th}$ joint and becomes part the opposing portion of the $n^{th}$ joint. The motion sensor further is uniquely adapted to apply to a non-spherical-wrist robot or a robot in which the three joints associated with orientation control of the end-effector do not intersect at a common point.

The motion sensor allows for six degrees of motion, three translation and three rotation. The three translation and two rotation degrees of motion are used to control the n−1 joints, while a third rotation is used to signal the $n^{th}$ joint.

The motion sensor is mounted within a small fixed frame that serves two purposes: it protects the motion sensor from damage; and it allows a user to easily grasp the sensor from any direction.

The motion sensor has a means to change the level of amplification or resolution depending on a function that is dependent on time and position of signals read by the motion sensor.

Haptic feedback is integrated into the grasping portion of the motion sensor. Haptic feedback is a physical stimulus provided to the user to simulate a tactile experience. This tactile experience can represent forces and torques that are applied to the robot end-effector in order to allow the user a greater understanding of the operating conditions of the robot system.

DESCRIPTION OF THE INVENTION

Figure 1A:
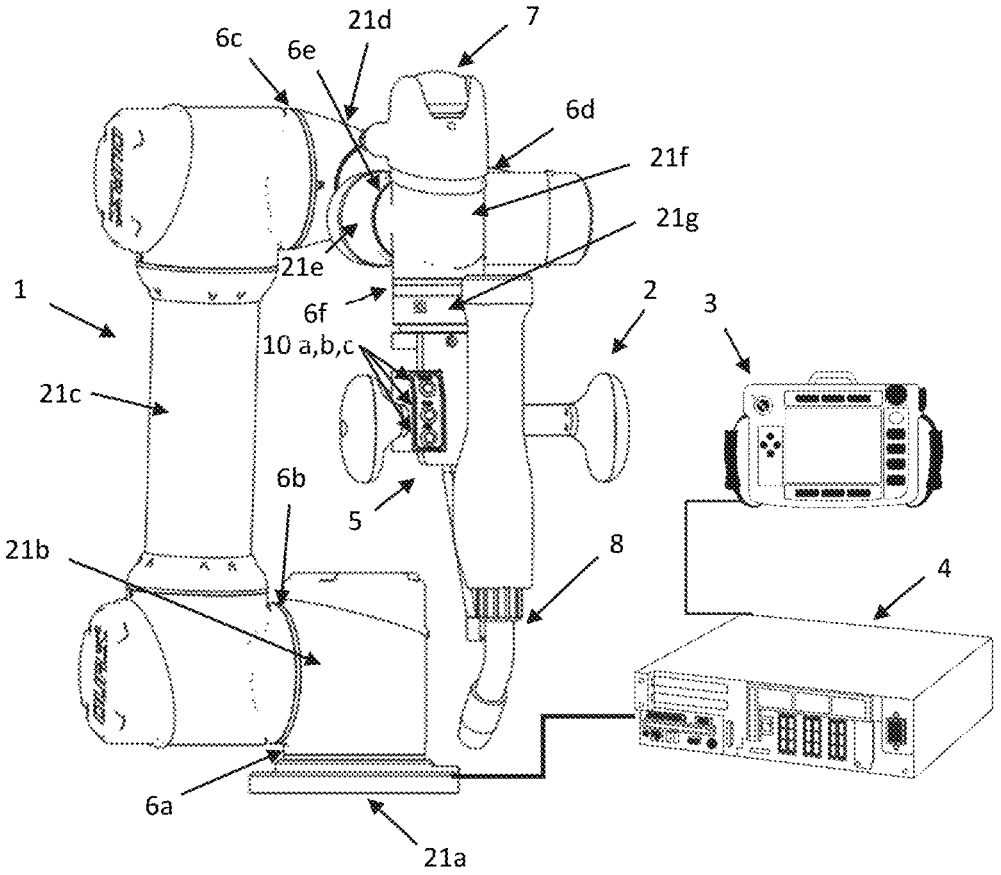
FIG. 1a shows a robot with lead-through handle, torch and motion sensor.

FIG. 1 shows the robot manipulator (1), the lead-through teaching handle (2) with input units (10a, 10b, 10c, 11). A teach pendant (3) contains additional input units. A controller (4) is part of the robot system (1). The lead-through teaching handle (2) is connected to the robot end-effector (5) which is connected to the last joint (6f) of the robot (1). A robot tool (8), in this case a welding torch, is connected to the robot end-effector (5). The welding torch (8) can be removed from the robot (1) while the lead-through teaching handle (2) remains connected to the robot (1). The lead-through teaching handle (2) and the welding torch (8) form the end-effector (5) of the robot (1). A motion sensor (7) is shown located in parallel and in-line with the last robot joint (6f). The robot manipulator or robot (1) is composed of six revolute joints linked in series, labeled 6a, 6b, 6c, 6d, 6e, 6f.

The motion sensor (7) will also be referred to as the motion sensing device. The motion sensor or motion sensing device (7) is commonly known in a number of forms including a joystick, a space mouse, a stylus pen, a 3D mouse, a six-dof joystick, or other device that can sense displacement of the movement of an object that can be manipulated by hand.

Figure 1B:
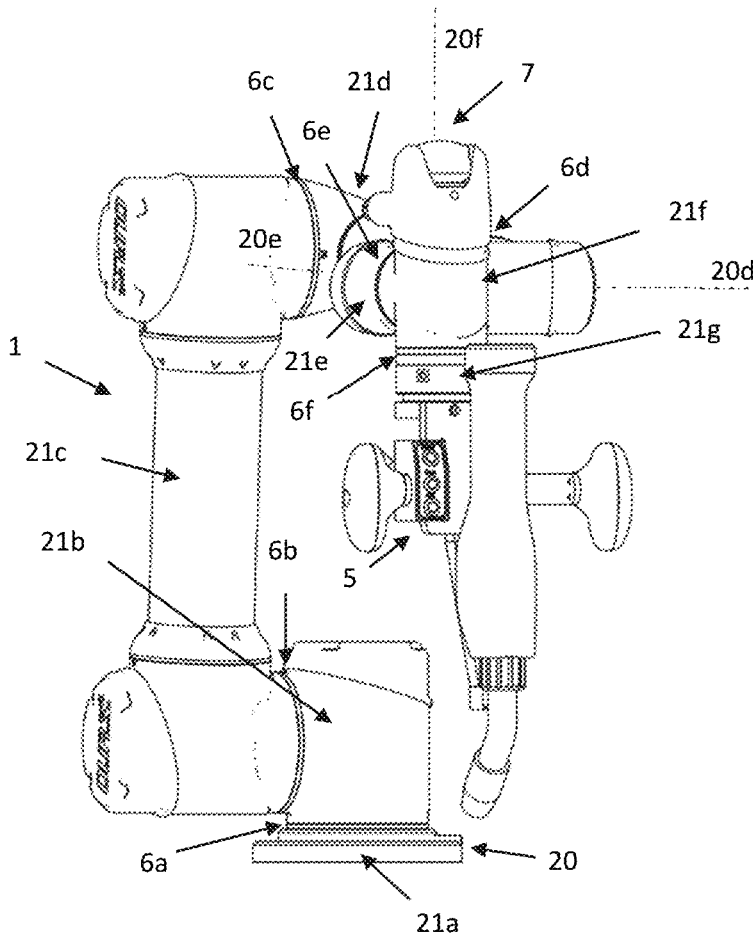
FIG. 1b shows a robot with six joints.
Figure 1C:
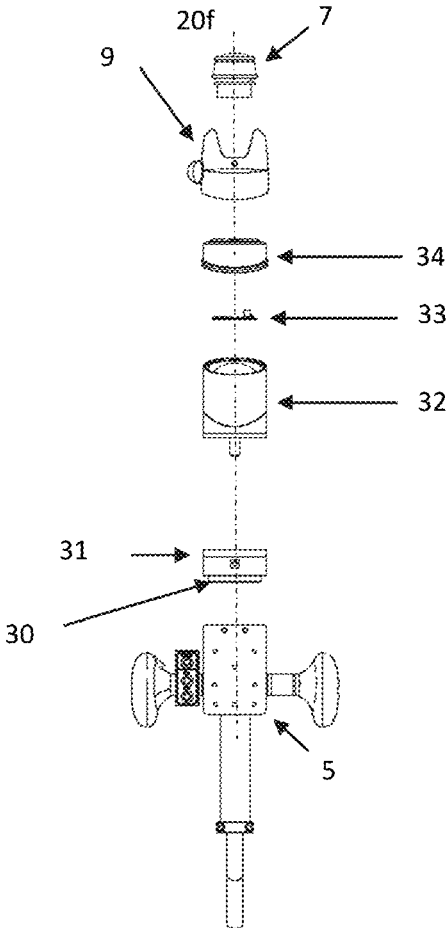
FIG. 1c shows an exploded view of joint 6 (f).

FIG. 1b shows the robot manipulator (1) with six joints (6a, 6b, 6c, 6d, 6e, 6f) linked in a serial fashion. The first joint (6a) is connected to the base (20) of the robot (1). The last joint (6f) is connected to the end-effector (5). The first three joints (6a, 6b, 6c) are generally called the arm of the manipulator (1) while the last three joints (6d, 6e, 6f) of the manipulator (1) are generally called the wrist. The manipulator (1) shown in FIG. 1 has a non-spherical wrist since the axes of the last three joints, namely, the axis (20d) of joint (6d), the axis (20e) of joint (6e), and the axis (20f) of joint (6f), do not intersect at a common point. FIG. 1b shows the motion sensor (7) attached to the link following joint (6e), the next to last joint in the manipulator (1). FIG. 1b shows the motion sensor (7) located along the axis (20f) of the last joint (6f) and in parallel with the last joint (6f). Further, FIG. 1c shows the motion sensor (7) mounted permanently and immediately adjacent to the motor (32) driving the last joint (6f). FIG. 1c shows a breakdown of joint (6f) with the motion sensor (7) permanently or rigidly mounted to the last joint (6f). Here, permanently mounted means fastened using fasteners, such as screws that are also used to mate the encoder (34) to the motor (32). Starting at one end of joint (6f), there is the mounting plate (30) for the end-effector (5), the gear transmission (31), the motor (32), the motor drive electronics (33), the motor encoder (34), and the motion sensor (7). The motion sensor (7) includes a protective frame (9) (FIGS. 1c and 6) that surrounds the motion sensor (7). This protective frame (9) can also serve as a seal and cover for the motor encoder (34) and motor drive electronics (33).

The arrangement of the components of the end-effector mounting plate (30), gear transmission (31), motor (32), motor drive electronics (33), and motor encoder (34) are common to a variety of robots, both having spherical and non-spherical wrists. The arrangement of components in this invention as shown in FIG. 1c having end-effector mounting plate (30), gear transmission (31), motor (32), motor drive electronics (33), motor encoder (34), and motion sensor (7) with all components in-line and sharing a common axis, the axis (20f) of joint (6f), is unique and possible only when both ends of joint (6f) are relatively exposed. In the case of a non-spherical robot topology as shown in FIG. 1b, the fourth joint (6d) intersects the fifth joint (6e) at a common point. The fifth joint (6e) intersects the sixth and last joint (6f) at a second common point that is not coincident with the first common point. This particular non-spherical arrangement is advantageous in that both ends of the last joint (6f) are exposed and accessible, one end for mounting a tool (8) on the end-effector (5) and the other end accessible for a user to grasp and move a motion sensor (7). In general, robots with spherical wrists do not have both ends of the last joint exposed. The motion sensor (7) permanently mounted on the end of the last joint (6f) and in-line with the last joint (6f) gives an advantage in intuitive control of the robot manipulator (1). The motion sensor (7) permanently mounted on the end of the last joint (6f) and in-line with the last joint (6f) also gives the advantage of reducing any obstructions in robot motion. Other designs place a device like the motion sensor (7) which would limit robot motion due to collision of various parts of the robot with the added device such as a motion sensor.

Rotation of joint (6f) does not cause any motion (translation or rotation) of the motion sensor (7).

Figure 2:
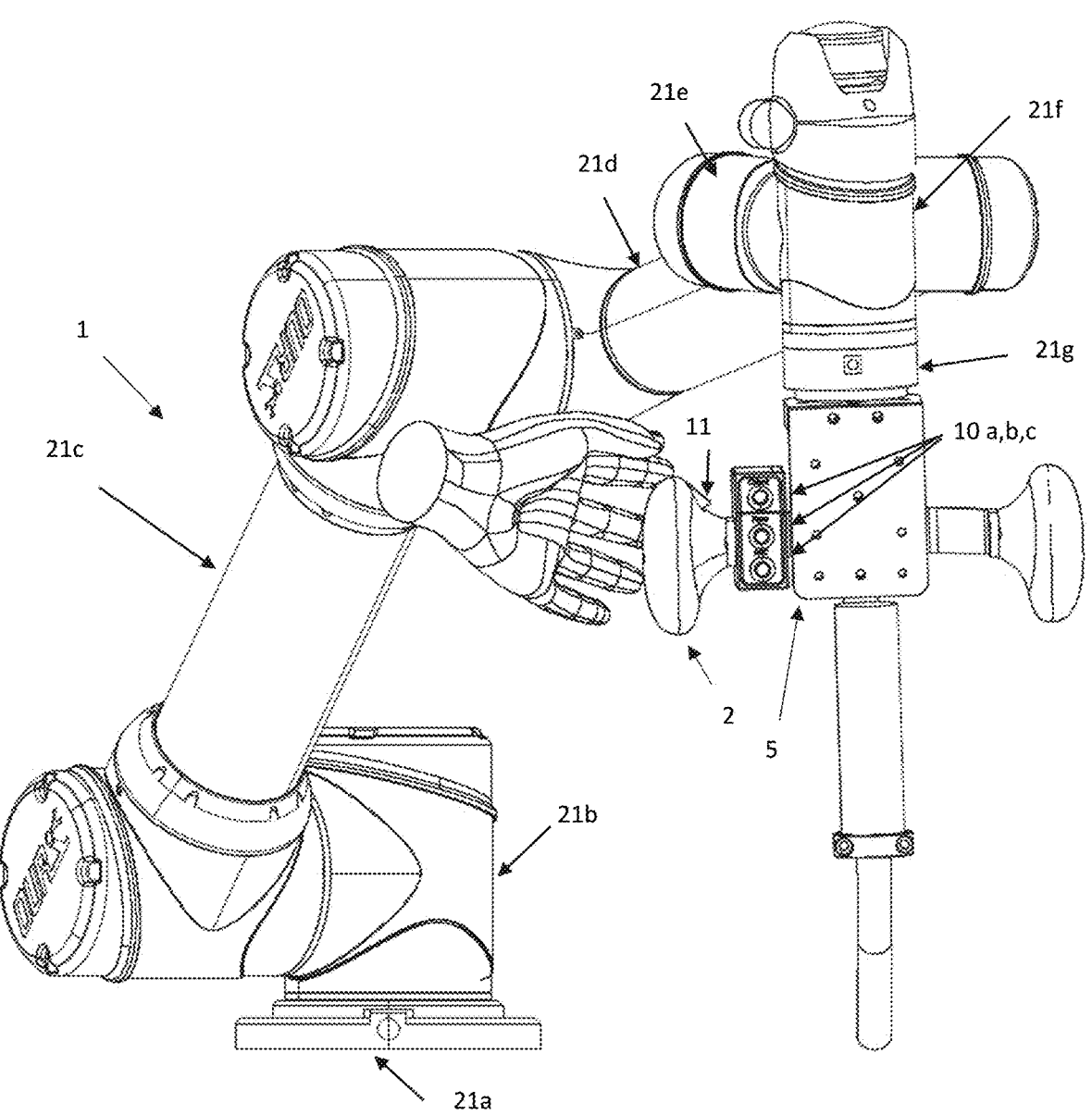
FIG. 2 shows manual guiding of the robot for lead-through teach programming.

The robot manipulator (1) includes motors, geared transmissions, motor drivers, and encoders on each of the six joints (6a, 6b, 6c, 6d, 6e, 6f). The motors and geared transmissions provide torque to each joint (6a, 6b, 6c, 6d, 6e, 6f) to react to torques provided by external loads and to provide accelerations to the joints (6a, 6b, 6c, 6d, 6e, 6f) to give the system motion. The motor drivers amplify the signal provided by the robot controller to send this amplified signal to the motors. The encoders on each of the six joints (6a, 6b, 6c, 6d, 6e, 6f) measure angular rotation of each joint (encoder (34) for joint (6f)). The robot manipulator (1) includes a controller (4) which contains a computer, memory, microcontroller unit and other electronic components. The robot controller (4) is in communication with the teach pendant (3) and the joint encoders at each of the robot joints (6a, 6b, 6c, 6d, 6e, 6f). The controller (4) receives signals from the teach pendant (3) and from the joint encoders. The user can provide desired commands to the robot manipulator (1) through the teach pendant (3). The encoders on each of the six joints (6a, 6b, 6c, 6d, 6e, 6f) provide current information on the configuration of the robot manipulator (1). The controller (4) contains algorithms that send control signals out to the motor drivers and motors to control or manage the movement of the robot (1) in a desired way based on user input through the teach pendant (3) and the current configuration of the robot (1). FIG. 2 shows a close-up of the lead-through teaching handle (2). In this case, four input units are shown as momentary push buttons that provide the following: Robot drag mode (11); teach a point (10a); toggle arc on/off (10b); and move to nearest program edit point (10c). Each input unit (10a, 10b, 10c, 11)

has a corresponding display LED to indicate that the function has been requested. When the robot drag mode momentary push button (11) is pressed, the operator is able to move the robot (1) freely by applying small forces on the lead-through teaching handle (2). One manner in which this is done is by having the robot controller (4) (FIG. 1a) enter a torque feedback mode in which it attempts to maintain the necessary torques required to support the robot (1) in a stable configuration while providing minimal resistance to manual guiding at the end effector (5). The advantage of this manual guiding is that it is easy and intuitive to move the robot (1) to desired pose (position and orientation). The disadvantage of this manual guiding is that it does not allow for an increase in resolution of control of the tool (8) tip and thus can be difficult to accurately position and orient the tool (8) exactly.

Figure 3:
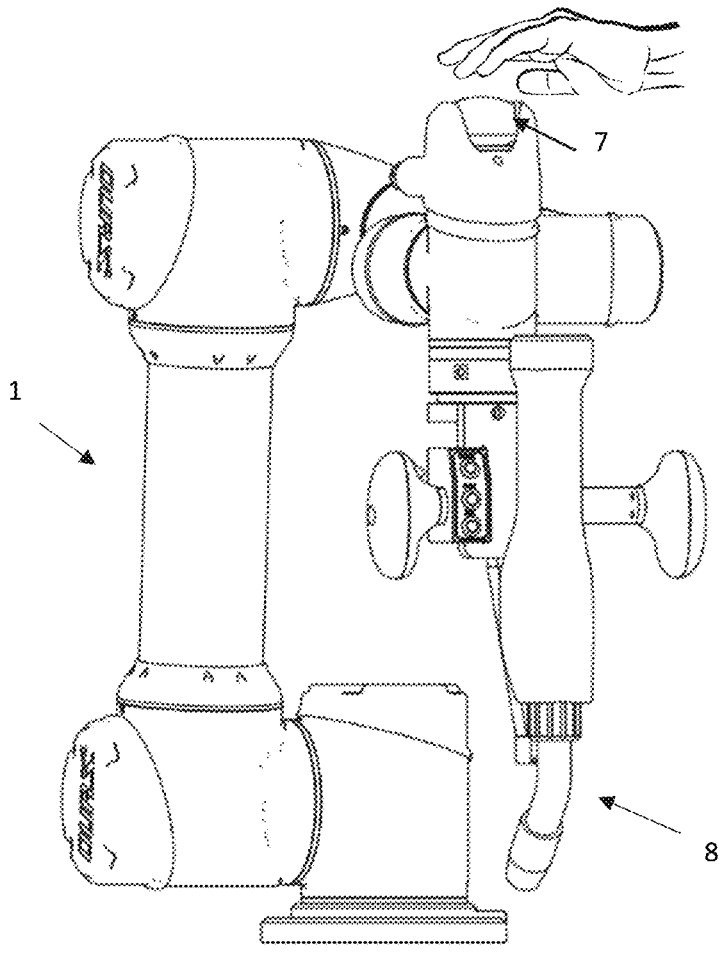
FIG. 3 shows the robot with motion sensor and user grasping the motion sensor to guide the robot through motion inputs to the motion sensor.
Figure 4:
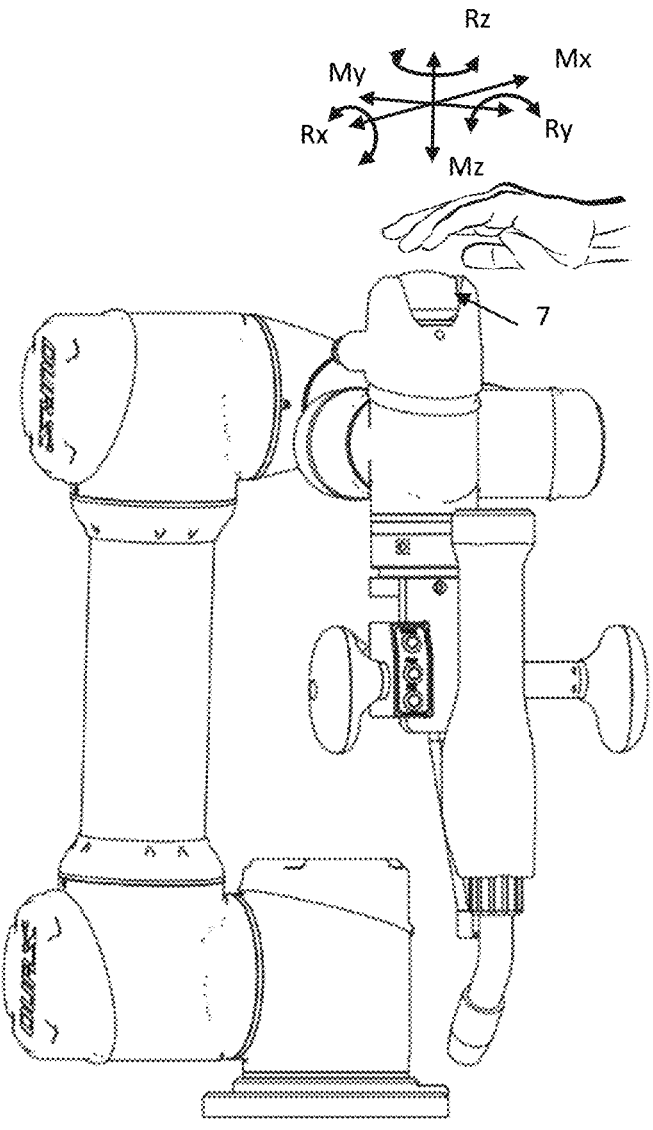
FIG. 4 shows the three translations and three rotations measured by the motion sensor.

FIG. 3 shows the robot (1) with motion sensor (7) and the hand of a robot operator grasping the motion sensor (7) to guide the robot (1) through motion inputs to the motion sensor. In this operating mode, an operator will grasp the motion sensor (7) to guide the robot tool (8) to a desired pose. The operator will do this by moving the motion sensor (7) in one or multiple of the six available directions in the motion sensor (7). These six directions consist of three translations and three rotations. FIG. 4 shows the three translations and three rotations measured by the motion sensor (7). These translations and rotations are labeled as Mx, My, Mz, Rx, Ry, Rz.

Movement of the motion sensor (7) corresponds directly with movements at the tool (8) tip. The frame of reference in which the motion sensor (7) can direct the tool (8) tip can be reprogramed. In the current description, the three translations move the torch (8) tip in the plane of the table for x, y motions of the sensor (7) and along the $5^{th}$ joint axis (6e) (axis of the motion sensor, z) for the z motions of the sensor (7).

The robot control system (4) is also in communication with the motion sensor (7). The user can provide desired commands to the robot manipulator (1) through the teach pendant (3) or through the motion sensor (7) or through a combination of both the teach pendant (3) and motion sensor (7). The controller (4) contains algorithms that send control signals out to the motor drivers and motors to control or manage the movement of the robot (1) in a desired way based on input from the teach pendant (3) or motion sensor (7). As an example, the operator can guide the robot (1) using the motion sensor (7) by moving the motion sensor (7) in a particular direction. The motion sensor (7) communicates with the controller (4). The controller (4) will then measure the current configuration of the robot manipulator (1) from the joint sensors and send signals to the motor drivers and motors to cause the robot manipulator (1) to move in a certain way as signaled by the user through the motion sensor (7).

The controller (4) contains algorithms that define the manner in which control signals are sent to the motor drivers and motors as a function of the robot (1) configuration as measured by the joint encoders and the user commands provided through the teach pendant (3) or motion sensor (7). A few examples of the manner in which an algorithm can define the motion of the robot manipulator (1) from the motion sensor (7) are described here. In one example, if the motion sensor (7) is moved in a single direction, for example the x direction of the motion sensor (7), then the robot controller (4) sends commands to the robot (1) to move in a single direction by an amount proportional to the motion of the motion sensor (7), for example the x direction of a selected frame of reference. As a second example, if the motion sensor (7) is moved in a single direction, for example the x direction of the motion sensor (7), then the robot controller (4) sends commands to the robot (1) to move in a single direction by a velocity proportional to the motion of the motion sensor (7), for example the x direction of a selected frame of reference. The six motions of the motion sensor (7), three translations and three rotations, can cause motion of the robot manipulator (1) to occur in different frames of reference. The particular frame of reference for this caused motion is selected by the operator. One example frame of reference could be a frame attached to the base of the manipulator (1) and not moving relative to ground. Another frame of reference could be a frame attached to the robot end-effector (5) and moving with the robot end-effector (5).

Another example of an algorithm that can define the motion of the robot manipulator (1) from the motion sensor (7) is described here. The scale or ratio of motion of the robot manipulator (1) relative to the motion of the motion sensor (7) can be changed. For precise motion, a large motion of the motion sensor (7) could correspond to a small motion of the robot manipulator (1). This could lead to very precise motion of the robot manipulator (1) and end-effector (5). For faster motion, a small motion of the motion sensor (7) could correspond to a large motion of the robot manipulator (1). This could lead to faster motion of the robot manipulator (1) and end-effector (5). Further, a combination of both modes, precise motion of the end-effector (5) and fast motion of the end-effector (5) could be achieved as follows. When the motion sensor (7) motions are within a certain range of the total motion of the motion sensor (7), say less than 75% of the motion of the motion sensor (7) range of motion, the robot manipulator (1) could be moved in a precise mode where the amplification of the motion sensor (7) motions gives smaller motions of the robot manipulator (1). When the motion sensor (7) motion is at the far end of its range of total motion, and is held in this range a certain time period, then the amplification of the motion sensor (7) motions can be increased such that the motion sensor (7) motions result in larger motions of the robot manipulator (1).

Figure 5:
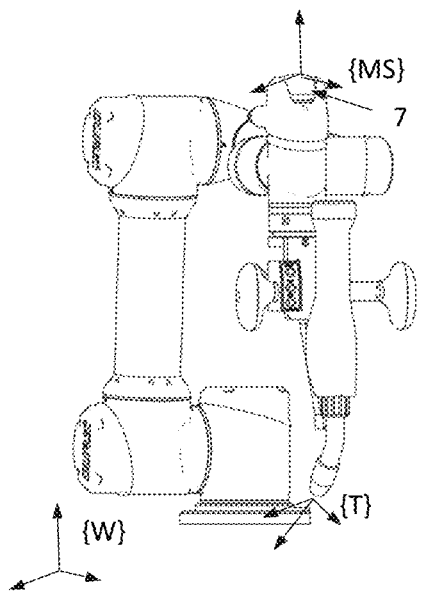
FIG. 5 shows a mappable frame of reference for the motion sensor.

FIG. 5 shows a mappable frame of reference for the motion sensor (7). In this figure, multiple frames are shown and could be considered including a motion sensor frame {MS}, a tool frame {T}, a part frame {P}, and a world frame {W}.

Figure 6:
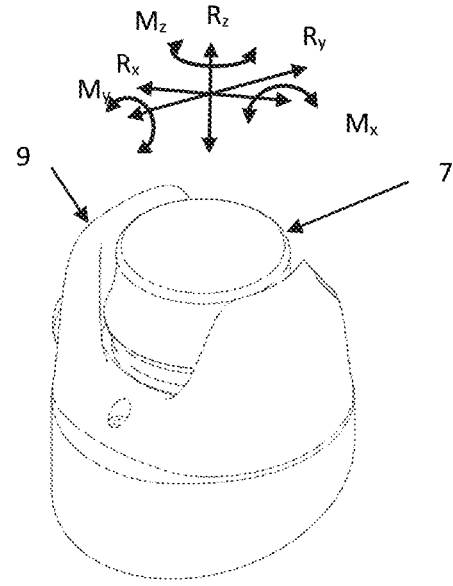
FIG. 6 shows a protective frame that surrounds the motion sensor.

FIG. 6 shows a protective frame (8) that surrounds the motion sensor (7). The protective frame (8) shown in this image has two protrusions that rise alongside and slightly above the motion sensor (7). These provide some protection to the motion sensor (7) in case of a collision. The protective frame (8) also provides sufficient room for the user to grasp the motion sensor (7). FIG. 6 also shows the six motions that can be input to the motion sensor (7) and sensed by the motion sensor (7): translations Rx, Ry, Rz; and rotations Mx, My, Mz.

Figure 7:
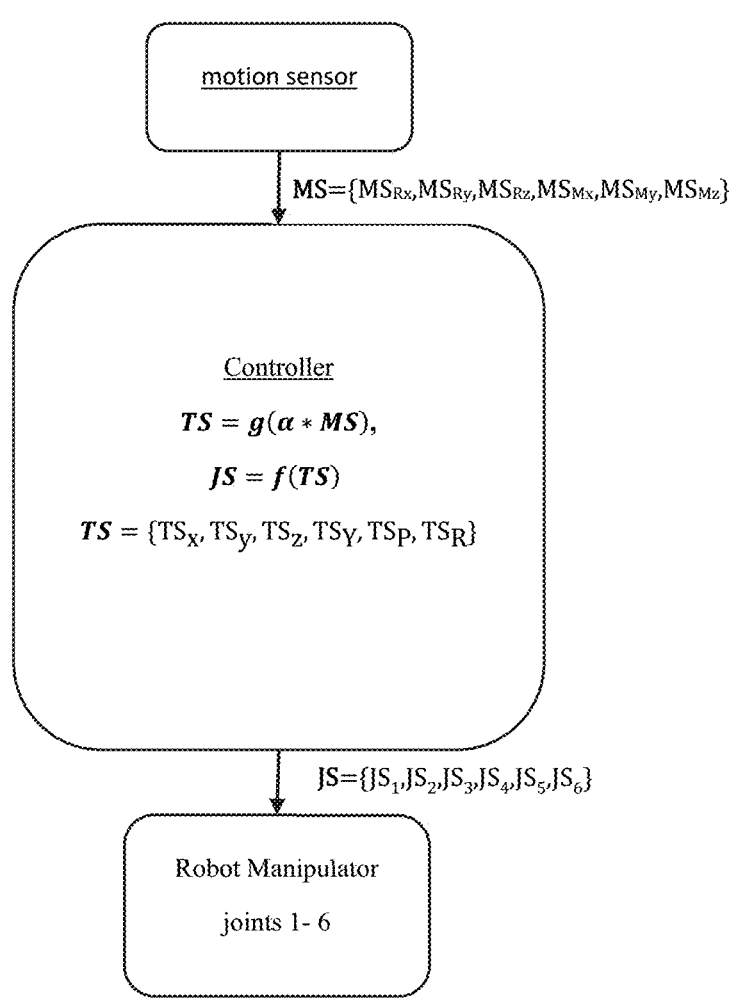
FIG. 7 shows an algorithm to vary the amplification or resolution of the motion sensor.

FIG. 7 shows an algorithm to vary the amplification or resolution of the motion sensor (7). The motion sensor (7) outputs a vector containing the six measured motions MS. The controller (4) (FIG. 1a) reads these measured motions MS and calculates a desired output for the six joints JS as joint angle commands for each joint. One example of this algorithm is shown in the equations below.

$$TS = g(\alpha * MS)$$

-continued
and $$JS = f(TS)$$

where $$MS = \{ MS_X \ MS_Y \ MS_Z \ MS_{Rx} \ MS_{Ry} \ MS_{Rz} \}^T$$

is the vector of measured motions from the motion sensor, $$TS = \{ TS_x \ TS_Y \ TS_Z \ TS_Y \ TS_P \ TS_R \}^T$$

is the tool space pose of the end-effector in xyz, YPR coordinates, $$JS = \{ JS_1 \ JS_2 \ JS_3 \ JS_4 \ JS_5 \ JS_6 \}^T$$

is the joint space or configuration space of the robot as angular positions of each joint, $$g(\alpha * MS)$$

is a mapping function that transforms motion sensor measured values to tool space description of the end-effector, $$f(TS)$$

is a kinematic function that transforms tool space description of the robot to joint space, and $$\alpha(t) =$$

$$\begin{bmatrix} \alpha_1(p_1, t_1) & 0 & 0 & 0 & 0 & 0 \\ 0 & \alpha_2(p_2, t_2) & 0 & 0 & 0 & 0 \\ 0 & 0 & \alpha_3(p_3, t_3) & 0 & 0 & 0 \\ 0 & 0 & 0 & \alpha_4(p_4, t_4) & 0 & 0 \\ 0 & 0 & 0 & 0 & \alpha_5(p_5, t_5) & 0 \\ 0 & 0 & 0 & 0 & 0 & \alpha_6(p_6, t_6) \end{bmatrix}$$

is the resolution or scaling parameter matrix with scaling parameters for each axis of motion, with each scaling parameter a function of the parameter $p_i$ and time, where the parameter $p_i$ is based on transition of the motion sensor axis from a low to high threshold and time $t_i$ is a measure of duration of the motion sensor in a certain time in the low or high threshold.

Alternatively, the motion sensor (7) has a resolution adjustment button (not shown) that can increase or decrease the resolution of the robot control from the motion sensor (7). The algorithm registers a value of resolution from the resolution adjustment button (increased, decreased, or toggling) and then uses the value of resolution as a scaling parameter between the motion sensor (7) displacement in a given direction and the robot (1) velocity in a corresponding direction. This proportionality constant is termed a as a two dimensional matrix containing scaling terms for each direction or axis. The value of a can also be determined from the degree of input to the motion sensor (7) and the time the motion sensor (7) measures a reading at or above a certain level. For example, a smaller value of a could correspond to the motion sensor (7) values reading at or below a certain threshold of the full range of sensed value of the motion sensor (7). A larger value of a could correspond to the motion sensor (7) values reading above a certain threshold, when that value stays above the threshold for a certain period of time.

In a further exemplary embodiment according to aspects of the present invention, with reference generally to FIGS. 8-11, haptic feedback is embedded in the grasping portion of the motion sensor (7). Haptic feedback is a physical stimulus provided to the user to simulate a tactile experience. This tactile experience can represent forces and torques that are applied to the robot end-effector (5) (FIG. 1a) in order to allow the user a greater understanding of the operating conditions or characteristics of the robot system (1). An example would be when the robot (1) makes contact with something in the workspace. Haptic feedback would let the user know through a tactile sense that this contact has occurred. This would allow the user to make changes to the motion provided to the robot (1) to avoid this contact. This could be very important if the user is planning a weld in a tight location where the torch (8) (FIG. 1a) needs to be placed close to, but not touching the workpiece. With haptic feedback, the user is able to guide the torch (8) very close to the workpiece and get immediate tactile feedback through the haptic feedback if that touch occurs. There are other applications in which haptic feedback could be used to improve robot (1) operation. If the operator moves the robot (1) near a singular position (one in which the robot (1) requires high or nearly infinite joint motor motions to achieve output tool motion), haptic feedback could indicate the direction and closeness to the singular position, and even provide cues how to move the robot (1) away from the singular position. Haptic feedback could be used to provide feedback about the welding processes as well. If the weld is enabled, haptic feedback could indicate this to the user.

Figure 8:
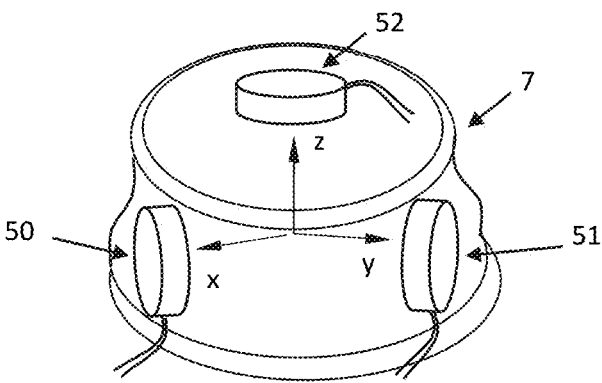
FIG. 8 shows a layout for a haptic feedback interface using vibro-tactile ERM motors to create haptic feedback as translation in the xyz directions.
Figure 9:
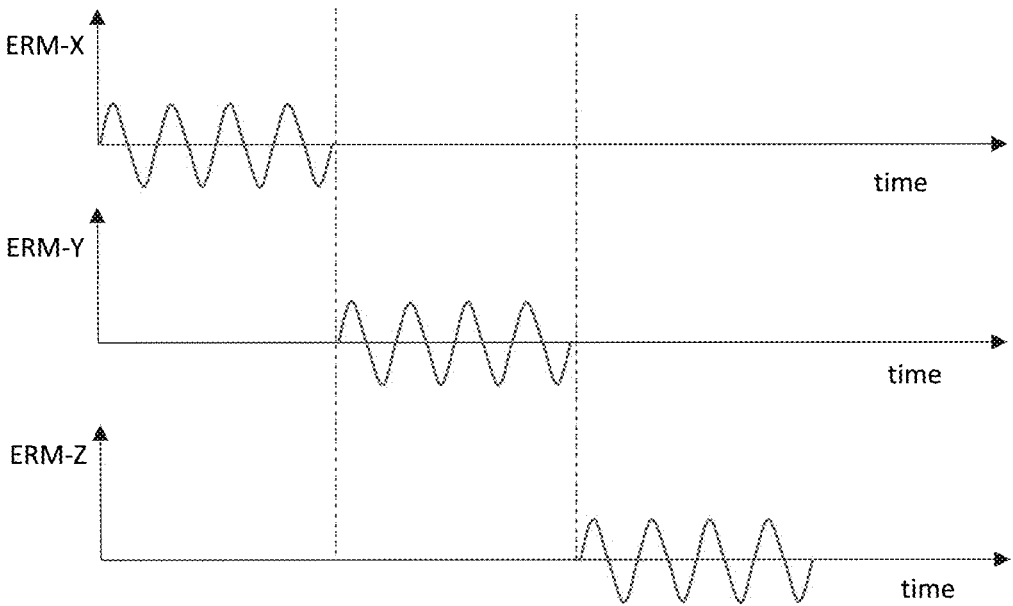
FIG. 9 shows a vibration pattern thereof to stimulate feedback in xyz directions.

One way to implement haptic feedback is shown in FIG. 8. In this case, vibro-tactile feedback is created using Eccentric Rotating Mass motors or ERM motors. In order to provide feedback corresponding to the x, y, and z axes of the motion sensor (7), an arrangement of three ERM motors (50, 51, 52) is shown. Here, one ERM motor is aligned with each of the x, y, and z axes. The x ERM motor (50), the y ERM motor (51), and the z ERM motor (52) can be embedded into the body of the motion sensor (7) so that the user can feel any vibration generated by these motors when grasping the motion sensor (7). By driving one of the x, y, or z ERM motors, the user feels vibration in the x, y, or z directions, respectively. FIG. 9 shows an example of input to the ERM-X motor (50), ERM-Y motor (51), and ERM-Z motor (52) at different points in time to signal haptic feedback in the x, y, and z directions at different points of time. In addition, combinations of excitation to the x, y, z ERM motors (50, 51, 52) can be used to signal haptic feedback in combinations of the x, y, and z directions.

Figure 10:
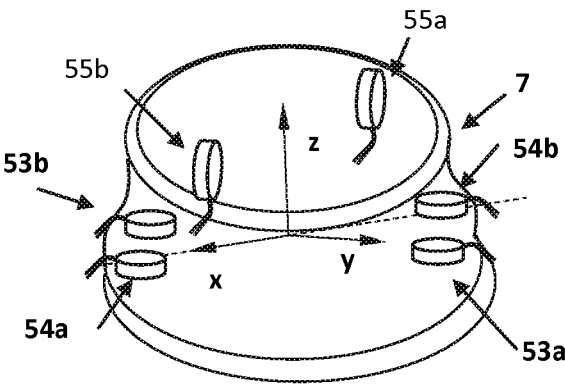
FIG. 10 shows a further layout for a haptic feedback interface using vibro-tactile ERM motors in out-of-phase pairs to create haptic feedback as a combination of translation and rotation about the xyz directions.
Figure 11:
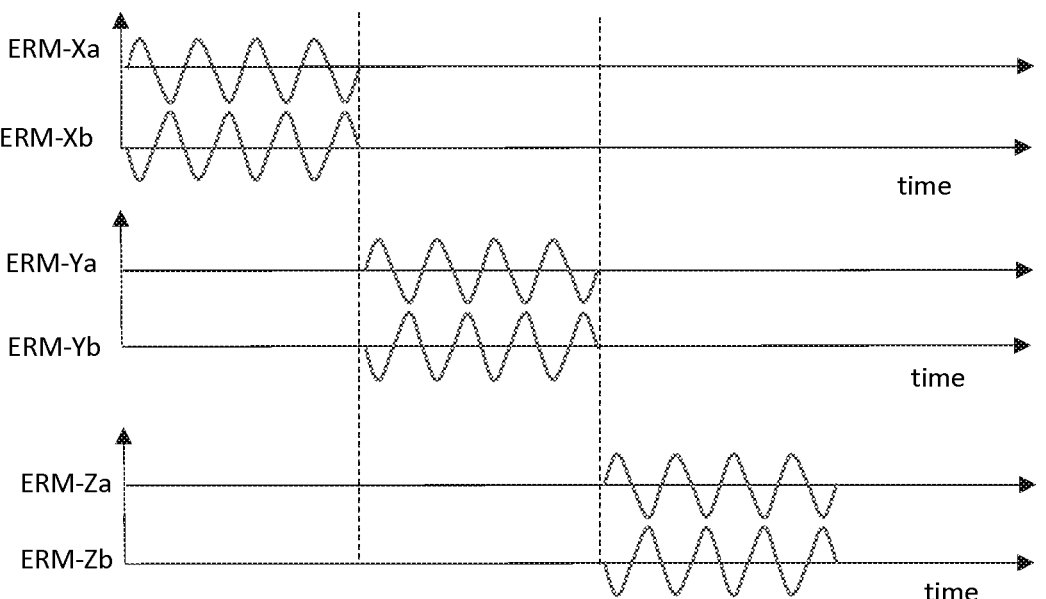
FIG. 11 shows a vibration pattern thereof to stimulate feedback in xyz and YPR directions.

In order to achieve six degrees of freedom (x,y,z and YPR) feedback, an alternative exemplary arrangement of six ERM motors is shown in FIG. 10. Here, three pairs of ERM motors (53a, 53b, 54a, 54b, 55a, 55b) are aligned with each of the x, y, and z axes, respectively, with an additional moment arm between each pair. ERM-X motor pairs (53a, 53b) can generate an excitation moment about the x axis. ERM-Y motor pairs (54a, 54b) can generate an excitation moment about the y axis. And ERM-Z motor pairs (55a, 55b) can generate an excitation moment about the z axis. By exciting the x, y, or z motor pairs (53a, 53b, 54a, 54b, 55a, 55b) in phase, a vibration pattern is given that could be distinguished as a translation along the x, y, or z axes, respectively. And by exciting the x, y, or z motor pairs (53a, 53b, 54a, 54b, 55a, 55b) out of phase, a vibration pattern is given that could be distinguished as a rotation about the x, y, or z axes, respectively. FIG. 11 presents vibration patterns corresponding to vibration feedback that could indicate rotations about the x, y, and z axes by exciting ERM motor pairs ERM-Xa (53a), ERM-Xb (53b) out of phase, ERM-Ya (54a), ERM-Yb (54b) out of phase, or ERM-Za (55a), ERM-Zb (55b) out of phase. While these demonstrate exemplary arrangements of ERM motors and excitation input, it is noted that a variety of other ERM motor arrangements could be constructed or other excitation patterns created to generate the desired haptic feedback, such that those shown and described are to be understood as illustrative and non-limiting.

Figure 12:
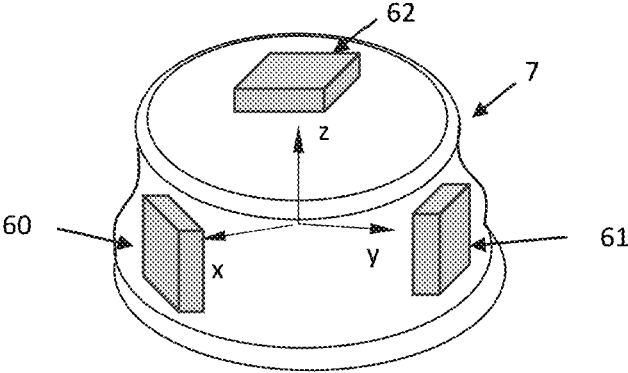
FIG. 12 shows a layout for a haptic feedback interface using actuators to create haptic feedback as translation in the xyz directions.

More generally, it will be appreciated by those skilled in the art that while vibro-tactile ERM motors are shown and described as the hardware for providing haptic feedback, any other technology, devices, hardware, or the like now known or later developed could be employed, alone or in any combination, as embedded in or otherwise operably installed on or within a motion sensor according to aspects of the present invention as providing or configured to provide any appropriate force, torque, linear or rotational resistance, or other physical or sensory feedback to the user in simulating tactile sensing based on the movement of the robot manipulator as caused by the controller in response to manipulation of the motion sensor without departing from the spirit and scope of the invention, such that the exemplary vibro-tactile ERM motors are to be understood as illustrative and non-limiting. By way of further illustration and not limitation, with reference to FIG. 12, to provide haptic feedback or create a physical stimulus to simulate a tactile experience, one or more actuators may be employed in conjunction with the motion sensor, whether employing a shape memory alloy or any other technology now known or later developed, in the exemplary embodiment being represented as three actuators (60, 61, 62) embedded in the motion sensor (7) to provide haptic feedback in the x, y, z directions.

Aspects of the present specification may also be described as follows:

1. A method for intuitive control of a robot manipulator (1) consisting of six revolute joints (6a, 6b, 6c, 6d, 6e, 6f) connected in series, numbered a first revolute joint (6a) through a sixth revolute joint (6f), seven rigid body links (21a, 21b, 21c, 21d, 21e, 21f, 21g), numbered a first rigid body link (21a) through a seventh rigid body link (21g), the first rigid body link (21a) connecting a ground and the first revolute joint (6a), the second rigid body link (21b) connecting the first and second revolute joints (6a, 6b), the sixth rigid body link (21f) connecting the fifth and sixth revolute joints (6e, 6f) and the seventh rigid body link (21g) connected to an output of the sixth revolute joint (6f), a robot controller (4), a motion sensing device (7) mounted on the sixth rigid body link (21f), the motion sensing device (7) further sensing a sensed input motion from a robot operator, communicating these sensed input motions to the robot controller (4) which causes the robot manipulator (1) to make a certain movement according to the sensed input motions.

2. A method for intuitive control of a robot manipulator (1) according to embodiment 1 wherein the motion sensor (7) is mounted directly colinear with the sixth revolute joint (6f).

3. A method for intuitive control of a robot manipulator (1) according to embodiment 1 wherein the motion sensor (7) allows for sensing six degrees of motion, three translation degrees of freedom and three rotation degrees of freedom.

4. A method for intuitive control of a robot manipulator (1) according to embodiment 1 wherein the motion sensor (7) allows for sensing six degrees of motion, three translation degrees of freedom and three rotation degrees of freedom. The three translation degrees of freedom and two rotation degrees of freedom are used to control the first through the fifth revolute joints (6a, 6b, 6c, 6d, 6e), while the third rotation degree of freedom is used to control the sixth revolute joint (6f).

5. A method for intuitive control of a robot manipulator (1) according to embodiment 1 wherein the robot controller (4) has a means to change the magnitude of the certain movement according to the sensed motions.

6. A method for intuitive control of a robot manipulator (1) according to embodiment 1 further comprising a protective frame (9) that surrounds the motion sensing device (7).

7. A method for intuitive control of a robot manipulator (1) according to embodiment 1 wherein the robot controller (4) has a means to select a frame of reference in which to make the certain movement of the robot manipulator (1) according to the sensed motions.

8. A method for intuitive control of a robot manipulator (1) consisting of six revolute joints (6a, 6b, 6c, 6d, 6e, 6f) connected in series, numbered a first revolute joint (6a) through a sixth revolute joint (6f), seven rigid body links (21a, 21b, 21c, 21d, 21e, 21f, 21g), numbered a first rigid body link (21a) through a seventh rigid body link (21g), the first rigid body link (21a) connecting a ground and the first revolute joint (6a), the second rigid body link (21b) connecting the first and second revolute joints (6a, 6b), the sixth rigid body link (21f) connecting the fifth and sixth revolute joints (6e, 6f) and the seventh rigid body link (21g) connected to an output of the sixth revolute joint (6f), the fourth revolute joint (6d) and fifth revolute joint (6e) intersecting at a first common point, the fifth revolute joint (6e) and the sixth revolute joint (6f) intersecting at a second common point, not coincident with the first common point, a motion sensing device (7) mounted on the sixth rigid body link (21f), the motion sensing device (7) further sensing input motion from a robot operator, communicating these sensed motions to the robot controller (4) which causes the robot manipulator (1) to make a certain motion.

9. A method for intuitive control of a robot manipulator (1) according to embodiment 8 wherein the motion sensor (7) is mounted directly colinear with the sixth revolute joint (6f).

10. A method for intuitive control of a robot manipulator (1) according to embodiment 8 wherein the motion sensor (7) allows for sensing six degrees of motion, three translation degrees of freedom and three rotation degrees of freedom.

11. A method for intuitive control of a robot manipulator (1) according to embodiment 8 wherein the motion sensor (7) allows for sensing six degrees of motion, three translation degrees of freedom and three rotation degrees of freedom. The three translation degrees of freedom and two rotation degrees of freedom are used to control the first through the fifth revolute joints (6a, 6b, 6c, 6d, 6e), while the third rotation degree of freedom is used to control the sixth revolute joint (6f).

12. A method for intuitive control of a robot manipulator (1) according to embodiment 8 wherein the robot controller (4) has a means to change the magnitude of the certain movement according to the sensed motions.

13. A method for intuitive control of a robot manipulator (1) according to embodiment 8 further comprising a protective frame (9) that surrounds the motion sensing device (7).

14. A method for intuitive control of a robot manipulator (1) according to embodiment 8 wherein the robot controller (4) has a means to select a frame of reference in which to make the certain movement of the robot manipulator (1) according to the sensed motions.

What is claimed is:

1. A method for intuitive control of a non-spherical wrist robot manipulator having a third-to-last revolute joint defining a third-to-last revolute joint axis, a second-to-last revolute joint defining a second-to-last revolute joint axis, and a last revolute joint defining a last revolute joint axis, wherein no more than two of the axes intersect at a common point, the robot manipulator further having a second-to-last rigid body link connecting the second-to-last and last revolute joints and a last rigid body link extending from the last revolute joint and defining an end-effector of the robot manipulator, the method comprising:

manipulating a motion sensor mounted on the second-to-last rigid body link of the robot manipulator between the second-to-last revolute joint and the last revolute joint and in-line with the last revolute joint, the motion sensor operably engaged with a controller of the robot manipulator to introduce sensed motions detected by the motion sensor that cause the robot manipulator to spatially correlate the sensed motions to movement of the robot manipulator; and providing feedback via the motion sensor as the motion sensor is manipulated to simulate tactile sensing based on the movement of the robot manipulator as caused by the controller in response to manipulation of the motion sensor.

2. The method of claim 1, wherein the step of providing feedback via the motion sensor comprises vibration.

3. The method of claim 1, wherein the step of providing feedback via the motion sensor comprises resistance.

4. The method of claim 1, wherein the simulated tactile sensing corresponds to an operating characteristic of the robot manipulator.

5. The method of claim 1, further comprising operably configuring the motion sensor with a plurality of eccentric rotating mass motors.

6. The method of claim 5, wherein the plurality of eccentric rotating mass motors comprises an x-axis motor, a y-axis motor, and a z-axis motor for providing translation feedback in the x, y, and z directions, respectively.

7. The method of claim 5, wherein:

the plurality of eccentric rotating mass motors comprises a pair of x-axis motors, a pair of y-axis motors, and a pair of z-axis motors;

in-phase excitation of the pair of x-axis motors, the pair of y-axis motors, or the pair of z-axis motors provides translation feedback in the x, y, or z directions, respectively; and out-of-phase excitation of the pair of x-axis motors, the pair of y-axis motors, or the pair of z-axis motors provides rotation feedback about the x, y, or z axes, respectively.

8. The method of claim 7, wherein the motion sensor is operably configured such that there is a moment arm between the pair of x-axis motors, between the pair of y-axis motors, and between the pair of z-axis motors.

9. A non-spherical wrist robot manipulator comprising:

a third-to-last revolute joint defining a third-to-last revolute joint axis, a second-to-last revolute joint defining a second-to-last revolute joint axis, and a last revolute joint defining a last revolute joint axis;

a second-to-last rigid body link connecting the second-to-last and last revolute joints and a last rigid body link extending from the last revolute joint and defining an end-effector of the robot manipulator;

a controller; and a motion sensor operably engaged with the controller and mounted on the second-to-last rigid body link of the robot manipulator between the second-to-last revolute joint and the last revolute joint and in-line with the last revolute joint, wherein the controller is configured to spatially correlate sensed motions of the motion sensor to the movement of the robot manipulator, and further wherein the motion sensor is configured to provide feedback when the motion sensor is manipulated to simulate tactile sensing based on the movement of the robot manipulator as caused by the controller in response to manipulation of the motion sensor.

10. The robot manipulator of claim 9, wherein the motion sensor is positioned opposite of the last rigid body link defining the end-effector.

11. The robot manipulator of claim 9, wherein the motion sensor is attached to the second-to-last rigid body link.

12. The robot manipulator of claim 11, wherein the motion sensor is attached permanently to the second-to-last rigid body link as by fasteners.

13. The robot manipulator of claim 9, wherein a protective frame is mounted about the motion sensor.

14. The robot manipulator of claim 9, wherein the motion sensor is configured to provide vibration feedback.

15. The robot manipulator of claim 9, wherein the motion sensor is configured to provide resistance feedback.

16. The robot manipulator of claim 9, wherein the simulated tactile sensing corresponds to an operating characteristic of the robot manipulator.

17. The robot manipulator of claim 9, wherein the motion sensor comprises a plurality of eccentric rotating mass motors.

18. The robot manipulator of claim 17, wherein the plurality of eccentric rotating mass motors comprises an x-axis motor, a y-axis motor, and a z-axis motor for providing translation feedback in the x, y, and z directions, respectively.

19. The robot manipulator of claim 17, wherein the plurality of eccentric rotating mass motors comprises a pair of x-axis motors, a pair of y-axis motors, and a pair of z-axis motors, wherein in-phase excitation of the pair of x-axis motors, the pair of y-axis motors, or the pair of z-axis motors provides translation feedback in the x, y, or z directions, respectively, and further wherein out-of-phase excitation of the pair of x-axis motors, the pair of y-axis motors, or the pair of z-axis motors provides rotation feedback about the x, y, or z axes, respectively.

20. The robot manipulator of claim 19, wherein the motion sensor is operably configured such that there is a moment arm between the pair of x-axis motors, between the pair of y-axis motors, and between the pair of z-axis motors.

21. The robot manipulator of claim 9, wherein the motion sensor comprises a plurality of actuators.

* * * * *